US007845548B2

(12) United States Patent
Kim et al.

(10) Patent No.: US 7,845,548 B2
(45) Date of Patent: Dec. 7, 2010

(54) LAMINATION METHOD

(76) Inventors: Ho-Sup Kim, 701-1802. Jel Mi Ma-Eul Bu Young E-Green Town, Jang Yu-Myeon, Gim Hae-City, Gyeong Nam (KR); Sang-Soo Oh, 101-601, Dong Seong Apt., Dae Bang-Dong, Chang Won-City, Gyeong Nam (KR); Tae-Hyung Kim, 803-604, Bu Young Apt., Gu Pyeong-Dong, Gu Mi-City, Cyeong Buk (KR); Kyu-Jeong Song, GA-405, Jeon Gi Yeon Gu Won Apt., Ga Eum Jeong-Dong, Chang Won-City, Gyeong Nam (KR); Hong-Soo Ha, 104-909, To Wal Sung Won Apt., Sang Nam-Dong, Chang Won-City, Gyeong Nam (KR); Rock-Kil Ko, 212-303, Hyundai Apt., Ban Rim-Dong, Chang Won-City, Gyeong Nam (KR)

( * ) Notice: Subject to any disclaimer, the term of this patent is extended or adjusted under 35 U.S.C. 154(b) by 0 days.

(21) Appl. No.: 12/574,457

(22) Filed: Oct. 6, 2009

(65) Prior Publication Data

US 2010/0022398 A1 Jan. 28, 2010

Related U.S. Application Data

(62) Division of application No. 11/386,598, filed on Mar. 22, 2006, now abandoned.

(30) Foreign Application Priority Data

Sep. 1, 2005 (KR) .................. 10-2005-0081099

(51) Int. Cl.
    *B23K 31/02* (2006.01)
(52) U.S. Cl. ..................... 228/235.2; 505/430; 505/431
(58) Field of Classification Search .............. 228/235.2; 505/430, 431
    See application file for complete search history.

(56) References Cited

U.S. PATENT DOCUMENTS

| 2,996,418 | A |   | 8/1961 | Bleil |
| 3,591,827 | A |   | 7/1971 | Hall |
| 4,011,982 | A | * | 3/1977 | Marancik .................... 228/208 |
| 4,452,389 | A |   | 6/1984 | Amin |

(Continued)

FOREIGN PATENT DOCUMENTS

JP    53017583 A    2/1978

(Continued)

*Primary Examiner*—Jessica L Ward
*Assistant Examiner*—Nicholas P D'Aniello
(74) *Attorney, Agent, or Firm*—Tutunjian & Bitetto, P.C.

(57) ABSTRACT

The present invention is directed to a lamination method. The lamination method includes making the interior of a process chamber a vacuum, the process chamber including a first and a second metal sheet, supplying the first and the second metal sheets, injecting a bonding material between the first and the second metal sheets supplied, bonding the first and the second metal sheets with each other, and heating the bonded metal sheets. The first metal sheet is a superconductive tape, and the second metal sheet is stabilization metal tape.

10 Claims, 3 Drawing Sheets

U.S. PATENT DOCUMENTS

| | | |
|---|---|---|
| 6,419,149 B1 | 7/2002 | Yano et al. |
| 6,455,172 B1 | 9/2002 | Yano et al. |
| 2002/0006526 A1 | 1/2002 | Polese et al. |

FOREIGN PATENT DOCUMENTS

| | | |
|---|---|---|
| JP | 01-127184 | 5/1989 |
| JP | 11-226753 | 8/1999 |
| JP | 2000-107871 | 4/2000 |
| JP | 2001-087872 | 4/2001 |
| JP | 2001-96376 | 4/2001 |
| JP | 2002-127298 | 5/2002 |
| JP | 2002-346765 | 12/2002 |

\* cited by examiner

LAMINATION METHOD

CROSS-REFERENCE TO RELATED APPLICATIONS

This application is a division application of U.S. application Ser. No. 11/386,598, filed on Mar. 22, 2006, now abandoned, which claims priority under 35 U.S.C §119 from Korean Patent Application 10-2005-81099 filed on Sep. 1, 2005, the entire contents of which are hereby incorporated by reference.

BACKGROUND OF THE INVENTION

The present invention relates to a bonding apparatus and, more particularly, to a lamination apparatus and a lamination method using the same.

Generally, metal sheets are bonded by means of brazing, soldering, plasma welding or laser welding according to the kinds of metals.

Welding is wherein metal sheets are bonded by solidifying bonding surfaces of the metal sheets after partially fusing the bonding surfaces. Plasma welding or laser welding should be used to fully seal the interior defined by the bonding. Unfortunately, plasma welding and laser welding incur much higher costs than soldering. Namely, the plasma welding and the laser welding have a low economical efficiency.

Soldering is wherein metal sheets are bonded by solidifying a bonding material after fusing the bonding material having a lower fusing point than the metal sheets to flow between the metal sheets bonded by a capillary phenomenon. The soldering is performed at a temperature of 430 degrees centigrade or lower. Unlike the soldering, brazing is performed at a temperature of 430 degrees or higher. Soldering and brazing are selectively applied according to the kinds of metal sheets.

When metal sheets are bonded by means of soldering, there is a limitation in selecting a bonding material because the bonding material should have a lower fusing point than the metal sheets. Further, bonding materials may be different in thickness and become porous to drop in density. Since the soldering is performed in the air, the bonding materials are apt to be oxidized. For these reasons, bonding force of a bonding material may diminish considerably.

SUMMARY OF THE INVENTION

Exemplary embodiments of the present invention are directed to a lamination apparatus and a lamination method using the same. In an exemplary embodiment, the lamination apparatus may include a process chamber; a first supply unit and a second supply unit disposed inside the process chamber for supplying a first and a second metal sheet, respectively; an injection unit for injecting a bonding material between the first and the second metal sheets supplied; a bonding unit for bonding the first and the second metal sheets with each other; and a pump connected to one side of the process chamber for making the interior of the process chamber a vacuum.

In an exemplary embodiment, the lamination method may include making the interior of a process chamber vacuum, the process chamber including a first and a second metal sheet; supplying the first and the second metal sheets; injecting a bonding material between the first and the second metal sheets supplied; bonding the first and the second metal sheets with each other; and heating the bonded metal sheets.

DETAILED DESCRIPTION OF PREFERRED EMBODIMENTS

Figure 1:
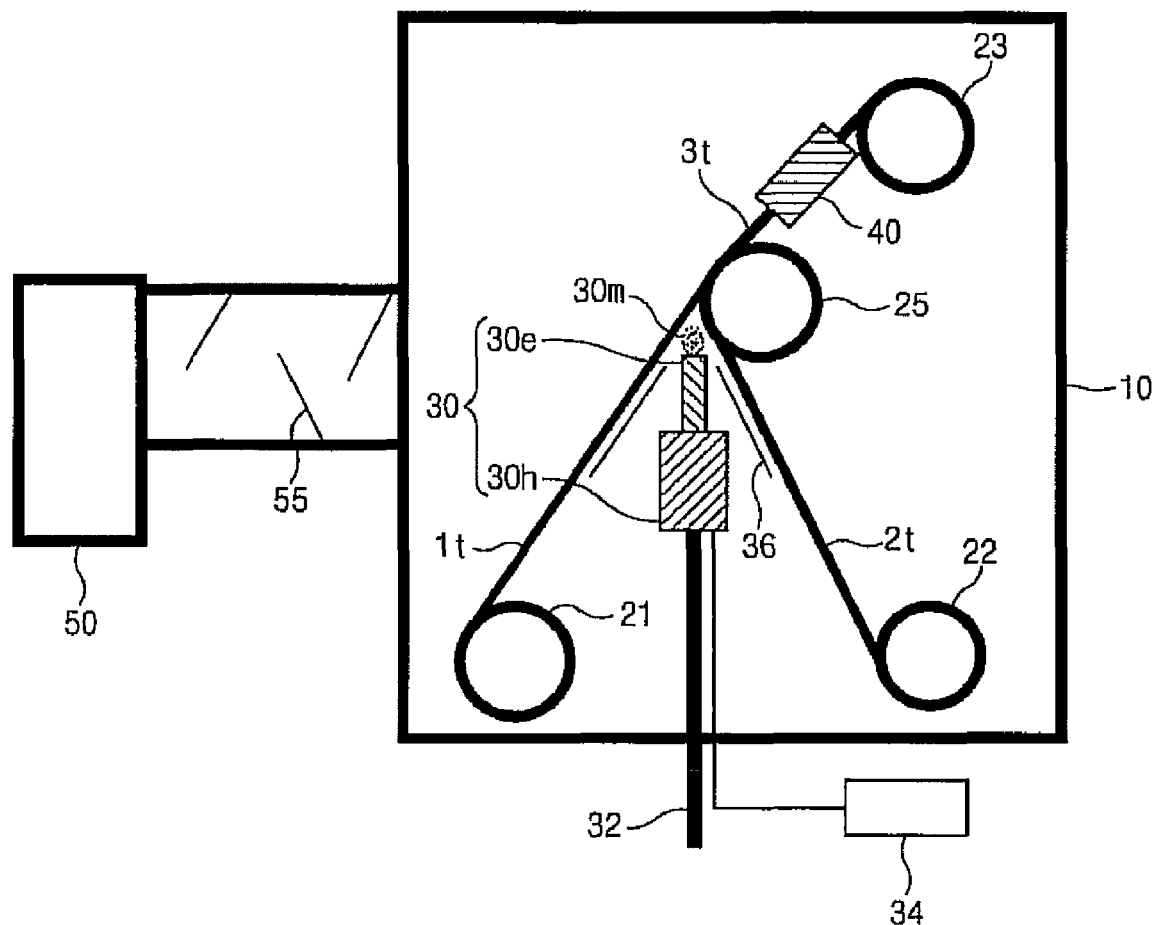
FIG. 1 illustrates a lamination apparatus according to the present invention.

The present invention will now be described more fully hereinafter with reference to the accompanying drawings, in which a preferred embodiment of the invention is shown. This invention, however, may be embodied in many different forms and should not be construed as limited to the embodiments set forth herein. Rather, the embodiment is provided so that this disclosure will be thorough and complete, and will fully convey the scope of the invention to those skilled in the art. In the drawings, the thicknesses of elements are exaggerated for clarity. Like numbers refer to like elements throughout.

A lamination apparatus according to the present invention is illustrated in FIG. 1. A first reel 21, a second reel 22, and a third reel 23 are disposed inside a process chamber 10. A first metal lamination tape 1t wound on the first reel 21 is provided by rotation of the first reel 21, and a second metal lamination tape 2t wound on the second reel 22 is provided by rotation of the second reel 22.

A metal evaporator 30 injects metallic vapor that is a bonding material 30m between the first and second metal lamination tapes 1t and 2t provided. The metal evaporator 30 includes a sealed housing 30h and an injection outlet 30e. A metallic substance is introduced into the housing 30h through a sample slot (not shown) formed at the housing 30h and inert gas is introduced into the housing 30h through a gas inlet (not shown). At this point, instead of inert gas, a metallic substance may be injected thereinto after turning to a high-temperature vapor. Inside the housing 30h, heating means (not shown) is provided for evaporating the metallic substance introduced into the housing 30h. The inert gas and evaporated metallic substance inside the housing 30h are injected fast through the injection outlet 30e. A width of the injection outlet 30e may be equal to that of the first or second metal lamination tape 1t or 2t. The evaporated metallic substance injected becomes the bonding material 30m, bonding the first and second metal lamination tapes 1t and 2t with each other. Metallic substances used as bonding materials are, for example, silver (Ag), zinc (Zn), copper (Cu), lead (Pb) and so forth. A temperature controller 34 is connected with the heating means for constantly controlling a temperature of the metallic substance. A position adjuster 32 is connected with the bottom of the metal evaporator 30 for adjusting the position of the metal evaporator 30. In order to enhance a deposition efficiency of the bonding material 30m, the injection outlet 30e is maximally closely adjacent to a bonding portion of the first and second metal lamination tapes 1t and 2t. In the metal evaporator 30, metal evaporation may be done by heating using a heater or high-frequency induction heating.

A heat shielding film 36 may be provided between the metal evaporator 30 and the metal lamination tapes 1t and 2t for preventing radiant heat of the metal evaporator 30 from excessively heating the metal lamination tapes t1 and t2. A bonding unit 25 enables the first and second metal lamination tapes 1t and 2t to adhere closely and to be bonded with each other, which is done by rotation of a roller.

The first and second metal lamination tapes are bonded with each other, constituting a metal lamination tape t3. The metal lamination tape t3 is wound on the third reel 23.

A heater 40 may be provided between the roller 25 and the third reel 23. The heater 40 may be one selected from the group consisting of a high-frequency induction heater, an infrared heater, and a halogen heater. The heater 40 may be installed inside the roller 25. The heater 40 heats the metal lamination tape 3t to enhance a bonding force. The heating temperature is lower than a fusing point of the bonding material 30m.

A pump 50 is disposed at one side of the process chamber 10, making the interior of the process chamber 10 a vacuum. Thus, the metallic substance evaporated by the metal evaporator 30 may be provided to a bonding portion of the first and second metal lamination tapes 1t and 2t without being oxidized. An adsorption sheet 55 may be provided between the process chamber 10 and the pump 50. The adsorption sheet 55 adsorbs the metallic vapor, i.e., the bonding material 30m to prevent the metallic vapor from flowing into the pump 50.

Figure 2:
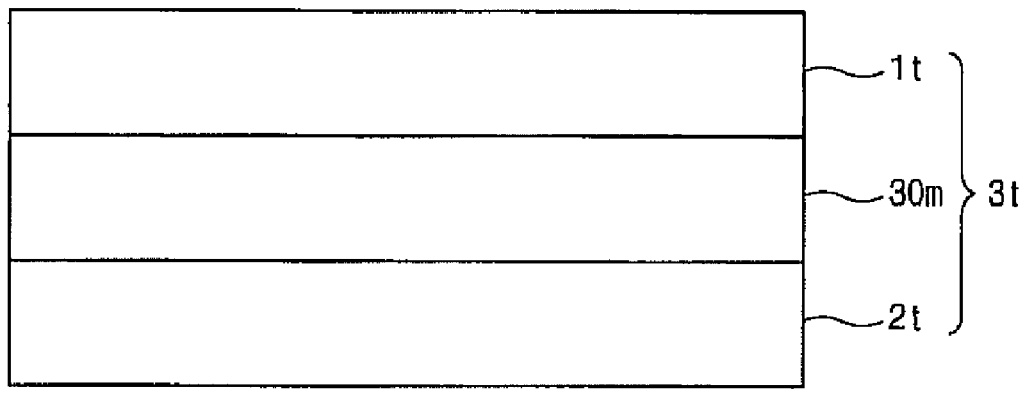
FIG. 2 is a cross-sectional view when two lamination tapes are bonded by the lamination apparatus according to the present invention.

FIG. 2 is a cross-sectional view when two metal lamination tapes are bonded by the lamination apparatus according to the present invention.

Referring to FIG. 2, a first metal lamination tape 1t and a second metal lamination tape 2t are bonded by means of a bonding material 30m. The bonding material 30m sandwiched between the first and second metal lamination tapes 1t and 2t has a uniform thickness. Although not illustrated in this figure, the bonding material 30m has a high density and a fine structure.

Figure 3:
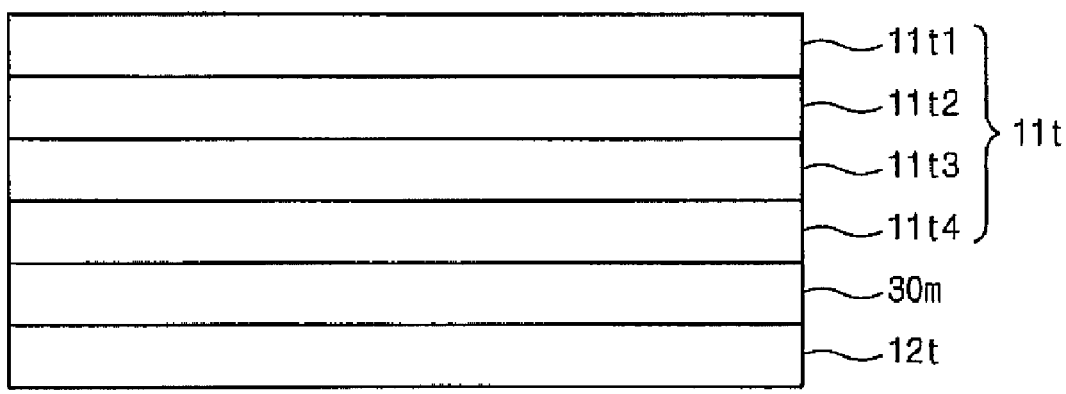
FIG. 3 is a cross-sectional view of a metal lamination tape in which a superconductive tape and a stabilization metal tape are bonded by means of a conventional lamination method.
Figure 4:
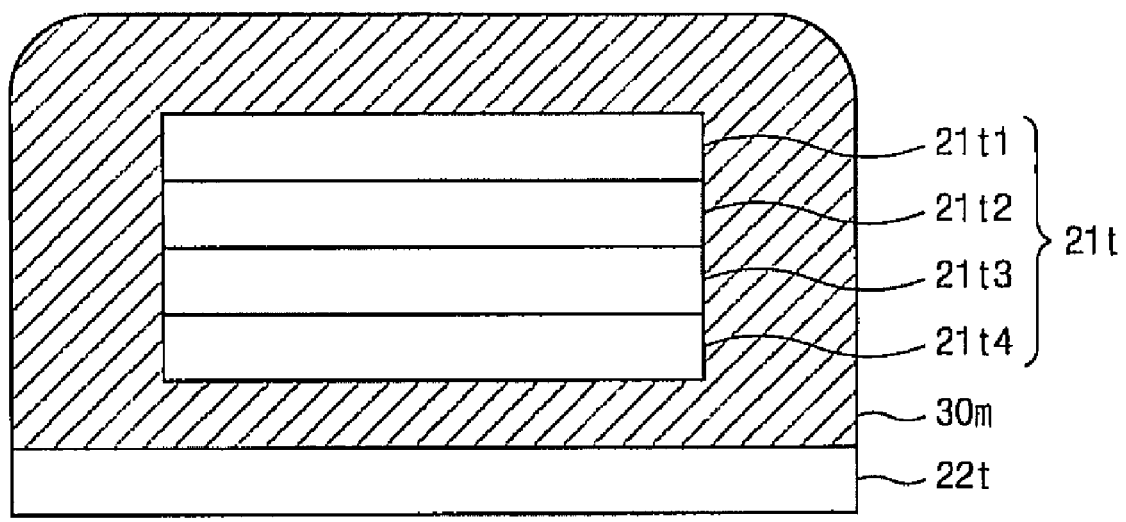
FIG. 4 is a cross-sectional view of a metal lamination tape in which a superconductive tape and a stabilization metal tape are bonded by means of a lamination method according to the present invention.

FIG. 3 is a cross-sectional view of a meta lamination tape in which a first metal lamination tape and a second lamination tape are bonded by means of a conventional lamination method. FIG. 4 is a cross-sectional view of a metal lamination tape in which a first metal lamination tape and a second metal lamination tape are bonded by means of a lamination method according to the present invention.

Referring to FIG. 3, a superconductive tape 11t includes a substrate film 11t1, a buffer film 11t2, a superconductive film 11t3, and a protective film 11t4. The superconductive tape 11t and a stabilization metal tape 12t are bonded by a bonding material 30m. The buffer film 11t2 is made of a dielectric substance and sandwiched between the superconductive film 11t3 and the substrate film 11t1. Therefore, if overcurrent higher than critical current flows to the superconductive film 11t3, current flows through the stabilization metal tape 12t to restrict a capacity for the overcurrent.

Referring to FIG. 4, a superconductive tape 21t has the same structure as the conventional superconductive tape shown in FIG. 3. However, a width of the superconductive tape 21t is smaller than that of a stabilization metal tape 22t. Thus, if the superconductive tape 21t and the stabilization metal tape 22t are bonded by a bonding material 30m, the bonding material 30m is deposited even on a side of the superconductive tape 21t. Further, the bonding material 30m may surround the superconductive tape 21t. Since the bonding material 30m made of a metal, i.e., has conductivity, a superconductive film 21t3 may be electrically connected to a substrate film 21t1. This may enable the overcurrent of the superconductive film 21t3 to be bypassed through the substrate film 21t1 and the stabilization metal tape 22t. As a result, a capacity for the overcurrent may increase.

According to the present invention, vacuum deposition is conducted to easily raise a temperature and gain a high vapor pressure in vacuum even when a fusing point of a bonding material is high. Thus, lamination tapes are bonded using various kinds of bonding materials. Since a vapor pressure of a bonding material inside an injection unit is precisely controlled by a temperature controller, a constant deposition rate is obtained to make a thickness of the bonding material uniform. In the vacuum deposition, an element-state bonding material is injected fast to be deposited. Therefore, a high-density bonding film is obtained. Since the vacuum deposition is conducted while reducing oxidation reactive gas, the possibility of oxidizing the bonding material is reduced. Even when the oxidation reactive gas remains, a high vapor pressure established at a bonding portion of two lamination sheets prevents the oxidation reactive gas from flowing to the bonding portion. For these reasons, a bonding force of the bonding material is enhanced. In addition, the cost of manufacturing and maintaining a lamination apparatus using the vacuum deposition is low. In a case where a superconductive tape and a stabilization metal tape are bonded by means of the lamination method according to the invention, the superconductive tape is electrically connected to a substrate film because the conductive bonding material is deposited on a side of the superconductive tape. Thus, overcurrent is bypassed through the substrate film and the stabilization metal tape to increase a capacity for the overcurrent.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

What is claimed is:

1. A lamination method comprising:
   making an interior of a process chamber a vacuum, the process chamber including a first and a second metal sheets;
   supplying the first and the second metal sheets;
   injecting a metallic bonding material between the first and the second metal sheets supplied;
   providing a heat shielding film configured for preventing excessive heating of the first and the second metal sheets prior to bonding;
   bonding the first and the second metal sheets with each other; and
   heating the bonded first and second metal sheets,
   wherein the first metal sheet is a superconductive tape, and the second metal sheet is stabilization metal tape wherein the metallic bonding material surrounds upper and lower surfaces, and each sidewall of the superconductive tape.

2. The lamination method of claim 1, wherein a width of the superconductive tape is smaller than that of the stabilization metal tape.

3. The lamination method of claim 2, wherein the superconductive tape includes a protective film, a superconductive film, a buffer film, and a substrate film that are stacked in the order named.

4. The lamination method of claim 1, wherein injection of the metallic bonding material is done by means of metallic evaporation.

5. The lamination method of claim 1, wherein the metallic evaporation is performed by heating using a heater or high-frequency induction heating.

6. The lamination method of claim 1, wherein heating the bonded first and second metal sheets is done by means of one selected from the group consisting of high-frequency induction heating, infrared heating, and heating using a halogen heater.

7. The lamination method of claim 1, wherein the metallic bonding material is at least one selected from the group consisting of silver (Ag), zinc (Zn), copper (Cu) and lead (Pb).

8. The lamination method of claim 1, wherein the heat shielding film is extended along the first and the second metal sheets, wherein the heat shielding film exposes a bonding area of the first and the second metal sheets.

9. The lamination method of claim 1, the first and the second metal sheets are bonded on a single roller.

10. The lamination method of claim 1, wherein the superconductive film is electrically connected to the substrate film by the metallic bonding material.

* * * * *